(12) United States Patent
Tong et al.

(10) Patent No.: US 7,478,111 B2
(45) Date of Patent: Jan. 13, 2009

(54) SYSTEM AND METHOD FOR CARRYING OUT LEGACY APPLICATION TRANSITIONS

(75) Inventors: Tack Tong, Scarborough (CA); Joseph Kim, Richmond Hill (CA)

(73) Assignee: International Business Machines Corporation, Armonk, NY (US)

(*) Notice: Subject to any disclaimer, the term of this patent is extended or adjusted under 35 U.S.C. 154(b) by 407 days.

(21) Appl. No.: 10/921,451

(22) Filed: Aug. 19, 2004

(65) Prior Publication Data
US 2005/0050076 A1    Mar. 3, 2005

(30) Foreign Application Priority Data
Aug. 28, 2003    (CA)    .................................. 2438997

(51) Int. Cl.
*G06F 12/00* (2006.01)
*G06F 17/30* (2006.01)

(52) U.S. Cl. ........................ 707/200; 707/1; 707/203; 715/239

(58) Field of Classification Search ............... 707/1–10, 707/100–104.1, 200–206; 709/201, 203, 709/229, 202; 715/239
See application file for complete search history.

(56) References Cited

U.S. PATENT DOCUMENTS

| | | | |
|---|---|---|---|
| 5,960,200 A | 9/1999 | Eager et al. | |
| 5,974,418 A * | 10/1999 | Blinn et al. ................. | 707/100 |
| 6,229,534 B1 | 5/2001 | Gerra et al. | |
| 6,360,249 B1 | 3/2002 | Courts et al. ................ | 709/293 |
| 6,418,448 B1 | 7/2002 | Sarkar ....................... | 707/104.1 |
| 6,687,873 B1 * | 2/2004 | Ballantyne et al. .......... | 715/500 |
| 6,754,670 B1 * | 6/2004 | Lindsay et al. .......... | 707/103 R |
| 6,810,429 B1 * | 10/2004 | Walsh et al. ................ | 709/246 |
| 7,130,885 B2 * | 10/2006 | Chandra et al. ............. | 709/206 |
| 2001/0042067 A1 | 11/2001 | Dayani-Fard et al. ....... | 707/102 |

FOREIGN PATENT DOCUMENTS

| | | |
|---|---|---|
| JP | 8314787 | 11/1996 |
| JP | 2001-109758 | 4/2001 |
| JP | 2001344147 | 12/2001 |
| JP | 2002-099561 | 5/2002 |
| WO | WO99/09494 | 2/1999 |
| WO | WO0157651 A2 | 8/2001 |

OTHER PUBLICATIONS

Bernard, P.J. et al., XML strategies for legacy database search, Mar.-Apr. 2003, IEEE, vol. 5, 16-21.*

(Continued)

*Primary Examiner*—Jean B Fleurantin
(74) *Attorney, Agent, or Firm*—Hamilton & Terrile, LLP; Gary W. Hamilton

(57) ABSTRACT

A system and method for carrying out transitions from legacy to new applications includes the definition of relational database views to permit relational queries defined for a database having a legacy schema to be run against a database having a new schema. The relational database views for the database having a new schema are generated with reference to and by selection from a set of database views defined for possible schema changes. The post-transition display of legacy display pages is handled by the preferred embodiment through the use of a view registry that associates a defined display view with a legacy view engine and a legacy display page.

3 Claims, 7 Drawing Sheets

OTHER PUBLICATIONS

Thiran, P. et al., Updating legacy databases through wrappers data consistency management, Nov. 8-12, 2004, IEEE, 58-67.*

Yu Ping et al., Migration of legacy web applications to enterprise JavaTM environments net.data® to JSPTM transformation, Oct. 2003, ACM, 223-237.*

Ad Bouneffa, M. et al. "Managing Schema Changes in Object-Relationship Databases", *95: Object-Oriented and Entity-Relationship Modeling. 14th International Conference, Proceedings INSPEC, Published: Berlin, Germany, 1995.

Rubensson, F., Java Tip 74: Build Dynamically Extensible Frameworks, http://www.javaworld.com/javatips/jw-javatip74_p.html, Designing Enterprise Applications with J2EE Platform, Second Edition, Sun Microsystems, 1990.

Lau, Terence et al, "Migrating e-commerce database applications to an enterprise Java environment," IBM Centre for Advanced Studies Conference, 2001, IBM Press.

* cited by examiner

SYSTEM AND METHOD FOR CARRYING OUT LEGACY APPLICATION TRANSITIONS

BACKGROUND OF THE INVENTION

1. Field of the Invention

The present invention relates generally to the transition of legacy computing applications and more specifically to a system and method for the access and display of data after transition from a legacy computing application.

1. Description of the Related Art

New application server platforms provide potential improved efficiency and functionality. As a result, legacy applications are often migrated to leading edge technology platforms. In particular, application server platforms compliant with Java 2 Enterprise Edition (J2EE) are increasingly popular. (Java and J2EE are trademarks of Sun Microsystems.) As a result, applications for defining display pages and accessing databases written to be compliant with other application server platforms are in many cases migrated to J2EE-compliant application server platforms.

Often, when this transition from a legacy application occurs, changes are made to legacy database schemas. Enterprises take the transition to a new platform as an opportunity to redefine and enhance existing legacy database schemas. This redefinition of database schemas permits the application on the new platform to exploit the new features available in the new application environment to which the enterprise is migrating its system. Where such restructuring of database schemas occurs, the cost of making the transition may be significant if there are changes to the applications for ensuring that the functionality provided in the legacy application is maintained in the new application.

The cost of such a change is potentially high in cases where legacy applications access relational databases with a defined schema and the defined schema is modified for the new application. For applications in which access in a relational database occurs in web-based display pages, the access is typically by way of relational queries (for example, the SQL SELECT statement). In the context of display pages in web-based systems, update relational operators (for example, UPDATE, INSERT, DELETE statements) are less common. Where display pages are defined against the popular MVC (Model B View B Controller) design pattern, the display pages are intended not to contain update relational operators as such functionality in the display pages is inconsistent with the separation of model, view and controller. Even where present, such updates are typically relatively simple to migrate if present. In contrast, relational database queries may be defined in a complex and intricate manner and the redefinition of such queries for a new schema is a potentially significant undertaking. Although efforts have been made to build tools to assist in rewriting legacy relational database queries for new schemas, the complexity and potential variation of such legacy relational database queries makes the definition and use of such tools for rewriting queries complex and difficult.

As referred to above, legacy applications in web based systems may include defined web-based display pages. Often legacy display pages are defined in a manner inconsistent with the JSP (JavaServer Pages) definition used in J2EE. (JSP is a trademark of Sun Microsystems.) To rewrite such display pages in conformance with a J2EE application server platform is also a potentially complex and costly exercise.

It is therefore desirable to provide a method and system to allow relational queries defined for a database schema in a legacy application to be used after transition to a new database schema and for display pages defined in a legacy application to be used in a system implemented in a J2EE application server platform, without requiring such pages to be rewritten.

SUMMARY OF THE INVENTION

Accordingly, the present invention provides a system and method for improved use of legacy relational queries and legacy display pages after transition from a legacy platform to a new platform.

According to another aspect of the present invention there is provided a method for use in the transition of a legacy application to a new application, the legacy application being defined to access a legacy relational database having a legacy schema and the new application being defined to access a transitioned relational database having a new schema, the method including the steps of determining a set of transition schema changes representing the transition of the legacy schema to the new schema, and generating one or more relational database views for the transitioned relational database by referring to a pre-defined set of relational database views relating to schema changes and identifying views in the pre-defined set that correspond to the set of transition schema changes, wherein the one or more relational database views being generated to map the new schema to the legacy schema, thereby permitting database queries originally defined for the legacy database to be executed against the transitioned relational database.

The pre-defined set of relational database views may include views relating to schema changes selected from the set of column-wise splits, row-wise splits, column-wise merges, row-wise merges, column name changes, column type changes, nullable to not-nullable transitions, value maps, column splits, and column merges. Further, the step of determining a set of transition schema changes may include the step of defining a representation of the transition schema changes.

Additionally, the step of generating one or more relational database views for the transitioned relational database may further include the steps of accepting the representation of the transition schema changes as input and generating the one or more relational database views based on the representation. Also, the representation of the transition schema changes is an XML file.

According to another aspect of the present invention there is provided a computer program product including a computer-readable signal-bearing medium, such as a recordable data storage medium, or a modulated carrier signal (such as transmission of a network including the Internet) the medium including means for accomplishing any one of the above methods.

According to another aspect of the present invention, a computer program product for use in the transition of a legacy application to a new application is provided, the legacy application accessing a legacy relational database having a legacy schema and the new application accessing a transitioned relational database having a new schema, the relationship between the two schemas being defined in a definition data representation (such as an XML file), the computer program product including a computer usable medium having computer readable program code means embodied in the medium, and including computer readable program code means for taking the definition data representation as input and, using a predefined set of relational database views relating to schema changes, generating one or more views for the new schema whereby relational queries defined in the legacy application are executable on the one or more views of the new schema. Additionally, the new application may be defined for execution on the J2EE platform.

According to another aspect of the present invention, a computer program product is provided for use in the transition of a legacy application to a new application, the legacy application including legacy display pages displayable using a legacy view engine. The legacy application accesses a legacy relational database having a legacy schema and the new application accesses a transitioned relational database having a new schema, the relationship between the two schemas being defined in a definition data representation. Preferably, the computer program product includes a computer usable medium having computer readable program code means embodied in the medium, and includes computer readable program code means for taking the definition data representation as input and, using a predefined set of relational database views relating to schema changes, generating one or more views for the new schema whereby relational queries defined in the legacy application are executable on the one or more views of the new schema. The computer program product also includes computer readable program code means for implementing a view engine manager for accepting display requests related to defined views for display to users and for consequently accessing a view engine registry, and computer readable program code means for implementing the view registry to store associations between the defined views for display to users, display pages and view engines and to provide information respecting the associations to the view engine manager on request. Further, the computer program product includes computer readable program code means for implementing a legacy view engine adaptor for generating parameters for the view engine for a selected view, whereby the legacy display pages may be referenced by the new application and are displayed on request using the legacy view engine on which the legacy display pages are displayable.

According to another aspect of the present invention, a method is provided for use in the transition of a legacy application to a new application, the legacy application including legacy display pages displayable using a legacy view engine, the method being implemented on a computer system including a view engine manager, a view registry and a legacy view engine adaptor. Prefereably, the method including the steps of storing associations between the defined views for display to users, display pages and view engines in the view engine registry; accepting display requests using the view engine manager, the requests being related to defined views for display to users; accessing a view engine registry based on requests received by the view engine manager; providing information from the view registry, requested in the above access step, respecting the associations to the view engine manager on request, and generating parameters for the view engine for a selected view using the view engine adaptor, whereby the legacy display pages may be referenced by the new application and are displayed on request using the legacy view engine on which the legacy display pages are displayable.

The present invention thus permits relational database queries defined for a legacy application to be executed in a newly defined application against a transitioned database with a new schema and for display pages defined in a legacy application to be accessed and displayed by a new application to be run on a new platform by accessing the legacy display engine.

BRIEF DESCRIPTION OF THE DRAWINGS

In drawings which illustrate by way of example only a preferred embodiment of the invention.

DESCRIPTION OF THE PREFERRED EMBODIMENT

As described in more detail below, certain components of the preferred embodiment are shown in the example block diagram of FIG. 1.

The example used in describing the preferred embodiment follows the Model-View-Controller design pattern that is often preferred in the design of enterprise applications. In accordance with this design approach, known to those skilled in the art, a transaction is typically started with a request to a Controller. Web-based applications following the MVC design pattern typically include the determination of a web-based display page (View) as a response to the request. In the J2EE (Java 2 Enterprise Edition) environment, the view components of the application (relating to display of information to users) are web pages defined using JSP. Operations carried out between receipt of the request and determination of the display page are under control of the Controller. It will be appreciated by those skilled in the art that the preferred embodiment may be implemented without conforming to MVC design principles.

Figure 1:
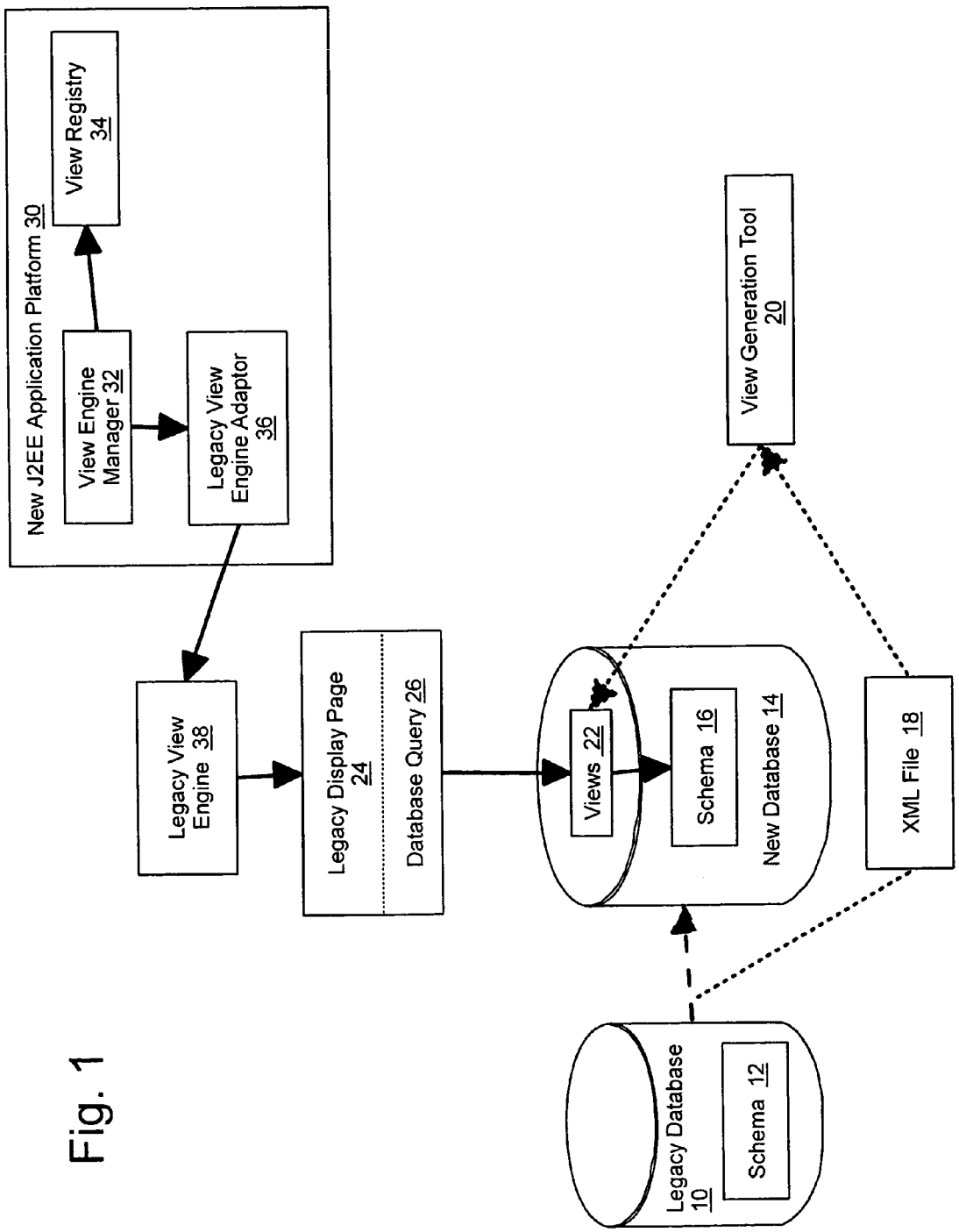
FIG. 1 is a block diagram illustrating components in an implementation of the preferred embodiment.

The example of FIG. 1 relates to the transition of a legacy web-based application to a J2EE environment. The legacy application includes access to legacy database 10 having database schema 12. FIG. 1 also shows transitioned database 14, for use with a post-transition application, having related schema 16. It will be appreciated by those skilled in the art that transitioned database 14 may replace legacy database 10 and that it is not necessary for both databases to exist at the same time. The preferred embodiment deals with the transition from the legacy application to the new application where the database is redefined in accordance with a new schema.

The example of FIG. 1 relates to the transition of legacy relational database 10 to new relational database 14. Schema 16 is a modified version of schema 12, or replacement for schema 12, that is updated to take advantage of a new application server platform to which the legacy system is migrated. The organization of the data in legacy database 10 (as defined in schema 12) is modified in transitioned database 14 (in accordance with schema 16).

In the preferred embodiment, the relationship between schema 12 and schema 16 may be defined in XML file 18. This XML file is generated by a database administrator comprising schema 12 and schema 16 and reflects the relationship between the two schemas. The information in XML file 18 defines how the relational database table definitions of legacy database 10 have been modified in transitioned database 14. It is understood that alternative definition data representations, other than XML files, may also be used to represent the schema changes.

A simple example of XML code, for defining the relationship between a relational table tsource and two relational tables ttarget1, ttarget2, is given below. In the example shown schematically in FIG. 2, the legacy database schema table tsource has columns id, c1, c2. The two tables ttarget1, ttarget2 defined in the new, post-transition database schema include columns id, c1 and id, c2, respectively:

```
<Source table="tsource">
  <KeyColumn name="id">
    <Target table="ttarget1" column="id" />
    <Target table="ttarget2" column="id" />
  </KeyColumn>
  <Column name="c1">
    <Target table="ttarget1" column="c1" />
  </Column>
  <Column name="c2">
    <Target table="ttarget2" column="c2" />
  </Column>
</Source>
```

EXAMPLE 1

As illustrated by the above example, in the preferred embodiment, XML file 18 contains a formal representation of the relationship between schemas 12 and 16. As is described in more detail below, the preferred embodiment defines one or more views for database 14 to permit legacy queries to be executed against post-transition database 14. In the preferred embodiment, a view generation tool may be used as part of the process to define this set of views. View generation tool 20 takes as input the XML file 18 contents that reflect the modifications from schema 12 that produce schema 16. In the example of FIG. 1, the output of view generation tool 20 is a set of views 22.

The set of views 22 is defined in accordance with SQL standards for views. The definition of the views within the set is carried out (as set out in more detail below) so that queries originally defined in the legacy application with reference to schema 12 are usable in the post-transition application with respect to transitioned database 14, as represented in views 22. The result is that data previously located in legacy database 10 in accordance with schema 12 is accessible by queries defined in accordance with that schema although such data is located in transitioned database 14. Effectively, views 22 are defined such that when legacy queries are run on transitioned database 14, using those views, schema 16 is transparent to the legacy queries. The set of views 22 maps the new schema 16 to the legacy schema 12.

In the example of FIG. 1, legacy display page 24 includes database query 26. Database query 26 is defined with respect to schema 12 for legacy database 10. According to the preferred embodiment, the set of views 22 is generated such that database query 26 will be executable against transitioned database 14, which includes views 22.

In this way, the system and method of the preferred embodiment permits database queries defined for the legacy system to be run against modified databases with schemas containing variations from the original legacy schema. The preferred embodiment provides the set of views 22 for mapping the new schema to the legacy schema. Although the preferred embodiment is described with reference to relational database access from a display page, other relational database access is also able to be carried out in accordance with this aspect of the invention.

As will be appreciated, views 22 may be generated automatically by view generation tool 20 or may be manually defined by a database administrator. Both approaches rely on the comparison of schema 12 and new schema 16. This comparison information may be obtained by reference to the modifications made to schema 12 to define schema 16. The creation of such a view generation tool will be carried out by those skilled in the art using the views for table level changes and column level changes referred to below. Such a view generation tool is not necessary for the preferred embodiment.

Another aspect of the preferred embodiment shown in FIG. 1 relates to display pages defined for the legacy system. Although the term Alegacy systems @ is used in this description, and may denote older types of proprietary technology for display and/or view of web pages, it will be understood that the preferred embodiment is usable where an appropriate transition is made from one application to another. In some cases, migrating web pages from these legacy proprietary technologies to applications in which display pages are defined in, for example, JSP, may be a barrier to migrating the application to a new platform such as J2EE. In many cases, there is a desire to maintain the same look and feel of the web pages after the transition from the legacy application to the new application. Web pages that define or are part of an existing web site are usually valuable and it is desirable to keep the web pages consistently defined. Rewriting web pages in JSP to reflect the functionality of the web page in the legacy application is a potentially costly requirement of making the transition from the legacy application to the new application.

In the preferred embodiment example reflected in FIG. 1, a new J2EE application platform 30 is shown. Components of the preferred embodiment relating to the use of legacy display pages are shown supported by J2EE application platform 30. It will be appreciated by those skilled in the art that the preferred embodiment is described with reference to J2EE but that the preferred embodiment may also apply to other application platforms.

Thus according to the preferred embodiment, view engine manager 32 is defined in association with application platform 30 (it should be noted that the Aview@ referred to here relates to displays to users and is not the relational database view referred to elsewhere in this description). View engine manager 32 is able to access view registry 34. Applications are, as in the prior art, able to request that information be displayed in association with a defined view. The application may not be required to specify the details of the display pages that will display the information but may simple specify a defined view. View registry 34 stores the association between views and the relevant display pages. Further, in the preferred embodiment, view registry 34 stores the association between the view, display pages and the view engine. In the preferred embodiment, each supported view engine (apart from the native J2EE view engine), is also provided with a view engine adaptor (shown as legacy view engine adaptor 36 in the example of FIG. 1).

In the preferred embodiment, view engine manager 32 is defined that will, based on the entries in view registry 34, invoke the appropriate view engine adaptor (in the example of FIG. 1, legacy view engine adaptor 36). The view engine adaptor marshals the parameters as required by the specific view engine and then invokes the view engine with an appropriate view document as specified in the view registry. The view engine in turn delivers the view as a response to the request.

This arrangement is used where an application platform is designed to use one or more view engines which do not include the legacy view engine. For example, J2EE supports the view engine for JSP only. Legacy display pages that are not defined with JSP are not directly displayable from the J2EE platform. The approach of the preferred embodiment permits such legacy display pages to be displayed without requiring the pages to be rewritten in JSP.

The example of FIG. 1 shows legacy view engine adapter 36. This adapter is used as a bridge to permit the legacy view engine (implemented in a different technological environment from the J2EE environment) to be invoked. Legacy view engine adapter 36 also marshals the data transferred to ensure that the operation of the legacy view engine is correct. In the example of FIG. 1, legacy view engine adapter 36 is shown launching legacy view engine 38. Legacy view engine 38 is able to run legacy display page 24. (Typically, page 24 was originally defined for display by legacy view engine 38). In this manner, previously defined display pages relating to the legacy application are used in association with new J2EE application platform 30 applications. The migration of display pages to the new application running on new J2EE application platform 30 may be accomplished in a staggered manner to allow new JSP definitions for display pages to be written, as required or in accordance with available resources.

It will be apparent to those skilled in the art that the use of view engines, with associated view engine managers, registries and adaptors, may also be applied in transitions that do not involve a change to database schemas. In such a transition, it may be advantageous to retain legacy display pages. A system that incorporates a view engine manager, view registry and view engine adaptor will provide the ability to seamlessly utilize legacy display pages and newly defined display pages.

Returning now to FIG. 1, one or more views may be generated to permit legacy query definitions to be run against a database with a new database schema. According to the preferred embodiment, the one or more views for the new schema are generated using a pre-defined set of views reflecting a set of possible schema changes. These may be table level changes or column level changes. Table level schema changes include column-wise splits, row-wise splits, column-wise merges, and row-wise merges. Column level changes include column name changes, column type changes, nullable to not-nullable transitions, value maps, column splits, and column merges. The details of the set of view definitions according to the preferred embodiment are set out below.

Figure 2:
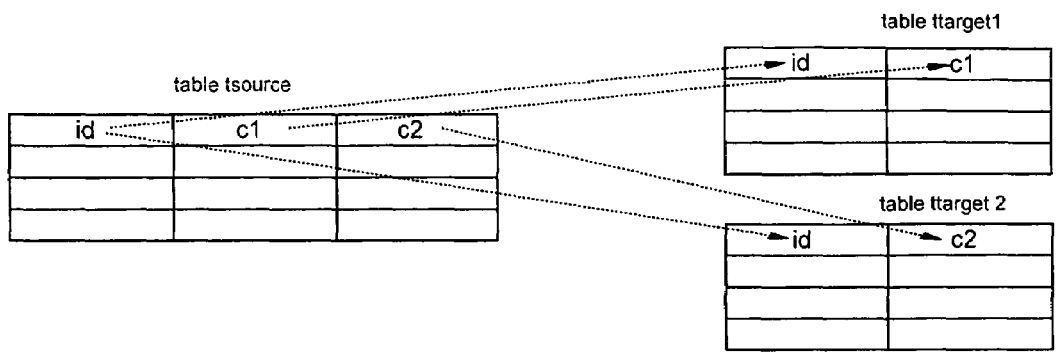
FIGS. 2-11 are schematic diagrams illustrating example transitions from a legacy relational database schema to a transitioned relational database schema.

A schema change that is a column-wise split is shown in the schematic representation of FIG. 2. Table tsource is shown with columns id, c1 and c2. The schema change results in two tables: ttarget1 (with columns id and c1) and ttarget2 (with columns id and c2). Columns in the source table are split into columns in multiple target tables. An example of such a schema change is where employee address data originally found in a single table with other employee information is split into a separate table from the employee table.

A database view (defined for tables ttarget1 and ttarget2) that is to emulate table tsource in the new application is defined below:

```
create view tsource (id, c1, c2) as
    select ttarget1.id, ttarget1.c1, ttarget2.c2
    from ttarget1, ttarget2
    where ttarget1.id = ttarget2.id
```

The result of defining the view tsource for the new database schema is that queries previously defined for the table tsource in the legacy application may be executed with reference to view tsource in the new application database having the new schema. As will be apparent to those skilled in the art, the example view given above is generalized and may be modified for use with other possible column-wise splits.

Figure 3:
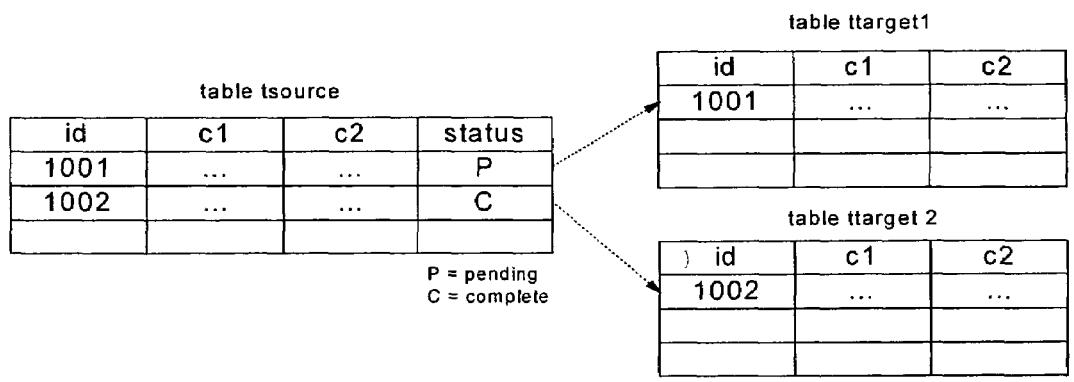

A schema change that is a row-wise split is shown in the schematic representation of FIG. 3. Table tsource is shown with columns id, c1, c2 and status (with values Pending and Complete). The schema change results in two tables: ttarget1 (with columns id, c1, c2) and ttarget2 (with columns id, c1, c2). Rows in source table tsource are split into rows in multiple target tables based on a discriminator column. In the example of FIG. 3, the status column is the discriminator column and the transition to the new schema reflects splitting orders table data (tsource) into a order pending table (ttarget1) and a order complete table (ttarget2). This can be seen in the example of FIG. 3 by row 1001 (with status Pending) being added to ttarget1 in the new database having the schema reflecting a row-wise split.

A database view in the preferred embodiment (defined for tables ttarget1 and ttarget2) that is to emulate table tsource is defined below:

```
create view tsource (id, c1, c2, status) as
    select ttarget1.id, ttarget1.c1, ttarget1.c2, 'P'
    from ttarget1
    union
    select ttarget2.id, ttarget2.c1, ttarget12c2, 'C'
    from ttarget2
```

As is the case with all the views set out in this description, the above view may be adapted for other specific schema changes of the same type (in this case a row-wise split).

Figure 4:
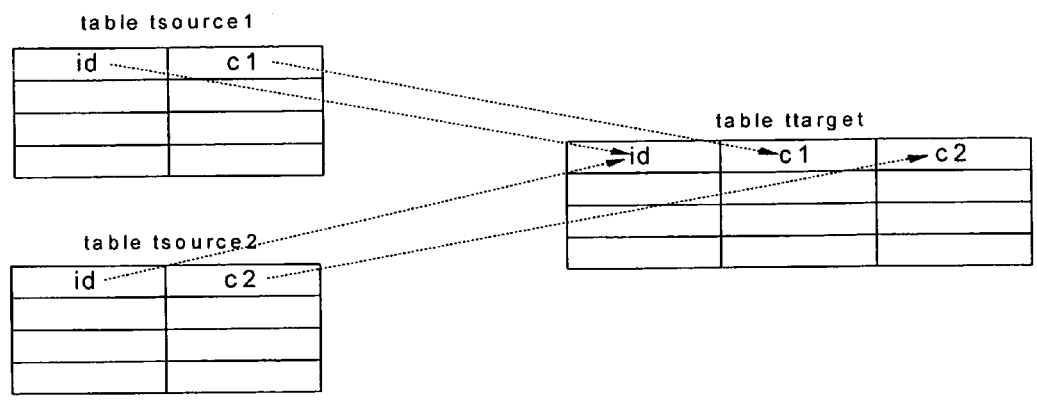

A schema change that is a column-wise merge is shown in the schematic representation of FIG. 4. Table tsource1 is shown with columns id, and c1 and table tsource2 with columns id and c2. The schema change results in the single table ttarget (with columns id, c1, c2). Columns in multiple source tables are merged into columns in a single target table. An example of such a schema change is merging an employee record table and an employee salary table into a single employee information table.

Database views in the preferred embodiment (defined for table ttarget) that are to emulate tables tsource1 and tsource2 of FIG. 4 are defined below:

```
create view tsource1 (id, c1) as
    select ttarget.id, ttarget.c1
    from ttarget
create view tsource2 (id, c2) as
    select ttarget.id, ttarget.c2
    from ttarget
```

Figure 5:
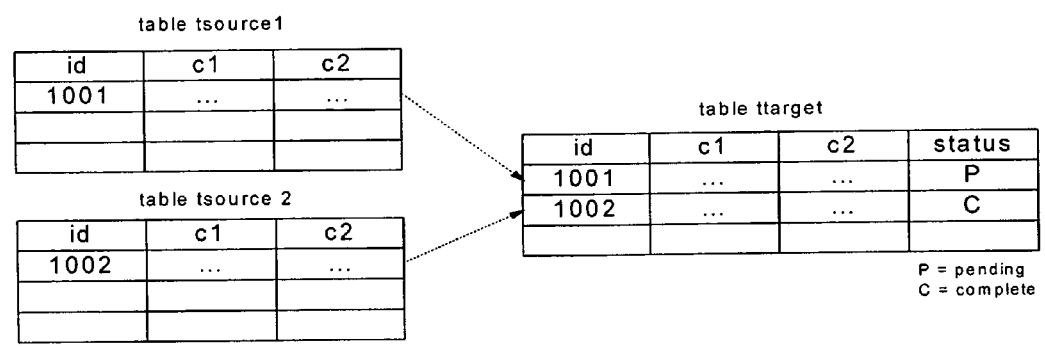

A schema change that is a row-wise merge is shown in the schematic representation of FIG. 5. Table tsource1 is shown with columns id, c1 and c2 and table tsource2 with columns id, c1 and c2. The schema change results in the single table ttarget (with columns id, c1, c2 and status). Rows in multiple source tables are now merged into a single target table and a discriminator column is added. An example is merging order pending table and order complete table into a single orders table.

Database views in the preferred embodiment (defined for table ttarget) that are to emulate tables tsource1 and tsource2 of FIG. 5 are defined below:

```
create view tsource1 (id, c1, c2) as
   select ttarget.id, ttarget.c1, ttarget.c2
   from ttarget
   where ttarget.status = 'P'
create view tsource2(id, c1, c2) as
   select ttarget.id, ttarget.c1, ttarget.c2
   from ttarget
   where ttarget.status = 'C'
```

The following view definitions are generated in the preferred embodiment for column level changes in database schemas.

Figure 6:
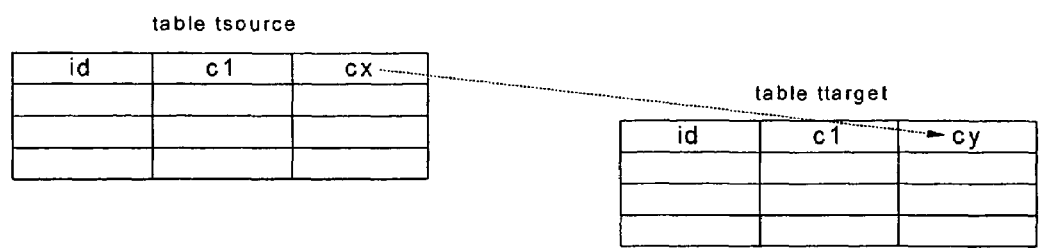

A schema change that is a column name change is shown in the schematic representation of FIG. 6. Table tsource is shown with columns id, c1 and cx. The schema change results in the single table ttarget (with columns id, c1, cy). Column name is changed to reflect the meaning of the column more appropriately. An example is LNAME is changed to LASTNAME.

A database views in the preferred embodiment (defined for table ttarget) that is to emulate table tsource of FIG. 6 is defined below:

```
create view tsource (id, c1, cx) as
   select ttarget.id, ttarget.c1, ttarget.cy
   from ttarget
```

Figure 7:
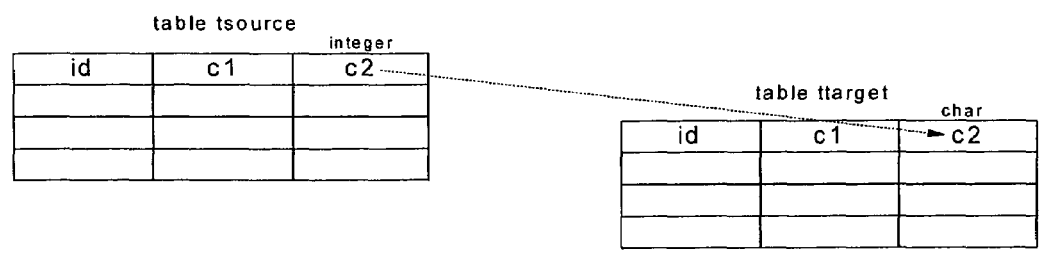

A schema change that is a column type change is shown in the schematic representation of FIG. 7. Table tsource is shown with columns id, c1 and c2, where c2 has type integer. The schema change results in the single table ttarget (with columns id, c1, c2, where c2 is of type char). In this schema change, column type is changed to reflect the appropriate usage.

A database view in the preferred embodiment (defined for table ttarget) that is to emulate table tsource of FIG. 7 is defined below:

```
create view tsource (id, c1, c2) as
   select ttarget.id, ttarget.c1, int(ttarget.c2)
   from ttarget
```

Figure 8:
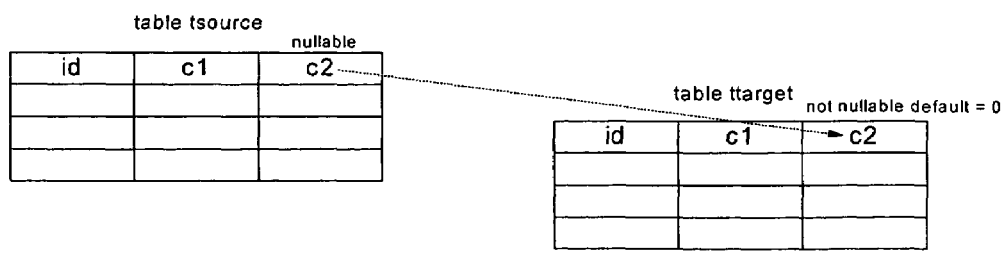

A schema change that is a change where a nullable column becomes not nullable is shown in the schematic representation of FIG. 8. Table tsource is shown with columns id, c1 and c2, where c2 is nullable. The schema change results in the single table ttarget (with columns id, c1, c2, where c2 not nullable and has a default value 0). A nullable column is changed to not nullable with a default value. An example is where a schema is changed in this way so as to give a correct value representation to a column that should not be nullable.

A database view in the preferred embodiment (defined for table ttarget) that is to emulate table tsource of FIG. 8 is defined below:

```
create view tsource (id, c1, c2) as
   select ttarget.id, ttarget.c1, case ttarget.c2
   when 0 then null else ttarget.c2 end
   from ttarget
```

Figure 9:
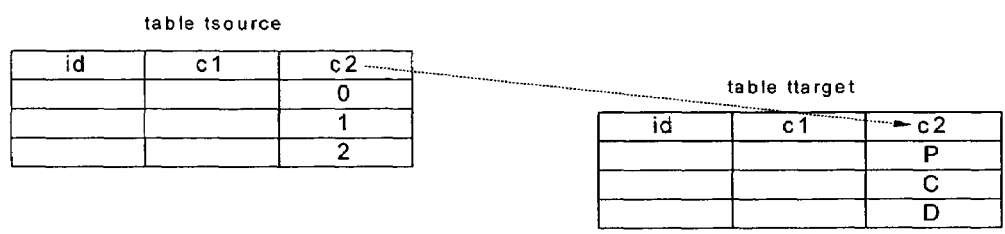

A schema change that is a value map change is shown in the schematic representation of FIG. 9. Table tsource is shown with columns id, c1 and c2. The schema change results in the single table ttarget (with columns id, c1, c2). Values in a column c2 are changed in the new database schema to other values based on a mapping. In the example of FIG. 9 the order status column c2 in table tsource has values 0, 1, 2 where 0 represents pending, 1 represents complete, and 2 represents deleted. In the new database schema the values in column c2 are changed to more meaningful values P, C, D representing pending, complete, deleted, respectively.

A database view in the preferred embodiment (defined for table ttarget) that is to emulate table tsource of FIG. 9 is defined below:

```
create view tsource (id, c1, c2) as
   select ttarget.id, ttarget.c1, case ttarget.c2
   when 'P' then '0' when 'C' then '1' when 'D'
   then '2' end
   from ttarget
```

Figure 10:
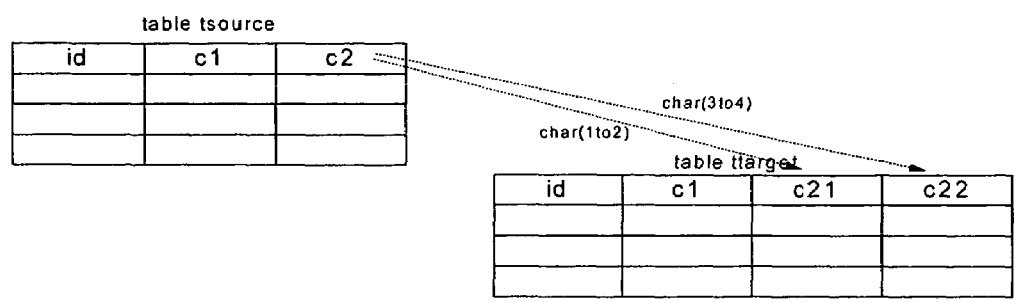

A schema change that is a column split change is shown in the schematic representation of FIG. 10. Table tsource is shown with columns id, c1 and c2. The schema change results in the single table ttarget (with columns id, c1, c21, c22). In the example of FIG. 10, the split of data in tsource.c2 is accomplished by moving characters 1 to 2 from tsource.c2 data to ttarget.c21 and characters 3 to 4 to ttarget.c22. As is shown, a column of the source table is now split into multiple columns in the target table. An example is separating a date column (ddmm) into 2 columns representing day (dd), month (mm).

A database view in the preferred embodiment (defined for table ttarget) that is to emulate table tsource of FIG. 10 is defined below:

```
create view tsource (id, c1, c2) as
   select ttarget.id, ttarget.c1, concat(ttarget.c21,
   ttarget.c22)
   from ttarget
```

Figure 11:
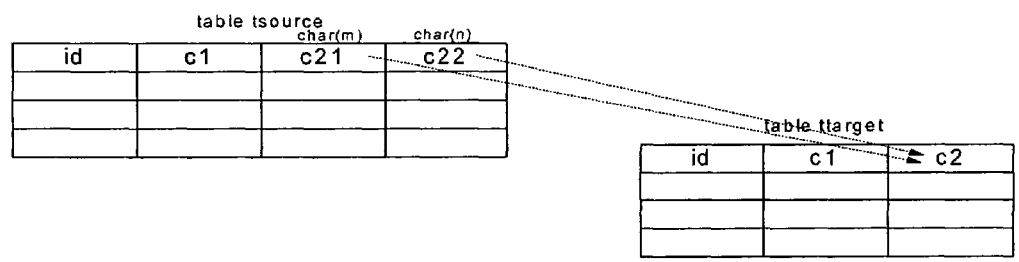

A schema change that is a column merge change is shown in the schematic representation of FIG. 11. Table tsource is shown with columns id, c1, c21 and c22. The schema change results in the single table ttarget (with columns id, c1, c2). Multiple columns in the source table are now merged into a single column in the target table. An example is merging the day (dd) column and month (yy) column into a single date (ddmm) column. In FIG. 11, ttarget.c2 has values that are a concatenation of character data of length m and n as shown for tsource.c21 and tsource.c22, respectively (Am@, An@ are lengths for C21 and C22).

A database view in the preferred embodiment (defined for table target) that is to emulate table tsource of FIG. 11 is defined below:

```
create view tsource (id, c1, c21, c22) as
   select ttarget.id, ttarget.c1, substr(ttarget.c2,
   1, m), substr(ttarget.c2, m+1, n)
   from ttarget
```

As can be seen, a table schema change may be a combination of a table level change plus any number of column level changes. The following is an example of a database view that can be generated for a combination of a table level column-wise split and a number of different column level changes:

```
create view tsource (id, c1, c2, c3, c4, c5) as
    select ttarget1.id,
    int(ttarget1.c1x),
    case ttarget2.c2 when 0 then null else ttarget.c2
end,
    case ttarget3.c3 when 'P' then '0' when 'C' then
'1' when 'D' then '2' end,
    substr(ttarget1.c4, 4, 7),
    concat(ttarget3.c5, ttarget2.c6)
    from ttarget1, ttarget2, ttarget3
    where ttarget1.id = ttarget2.id and
    ttarget2.id = ttarget.3.id
```

By analysing and classifying the schema changes, it is found that creating database views is more simple than attempting to translate (rewrite) legacy application queries which are potentially complex.

The above types of schema changes are used in the preferred embodiment to define a set of views for post-transition relational database schemas. As shown in FIG. 1, XML files (such as XML file 18) are defined to represent the changes from the legacy to the new schema. View generation tools (such as view generation tool 20) are defined using the types of schema changes set out above. In the example of FIG. 1, XML file 18 is taken as input for view generation tool 20. The latter processes XML file 18 by using the information encapsulated in that file, in conjunction with the set of schema changes set out above, to define a set of views shown in FIG. 1 as views 22.

For example, the XML code set out above in Example 1 defines the column-wise split of FIG. 2. View generation tool 20 parses such XML code to define the view set out above for the FIG. 2 example. View generation tool 20 thus carries out view generation based on the XML input, which defines in detail the type of schema changes implemented in the transition.

Figure 12:
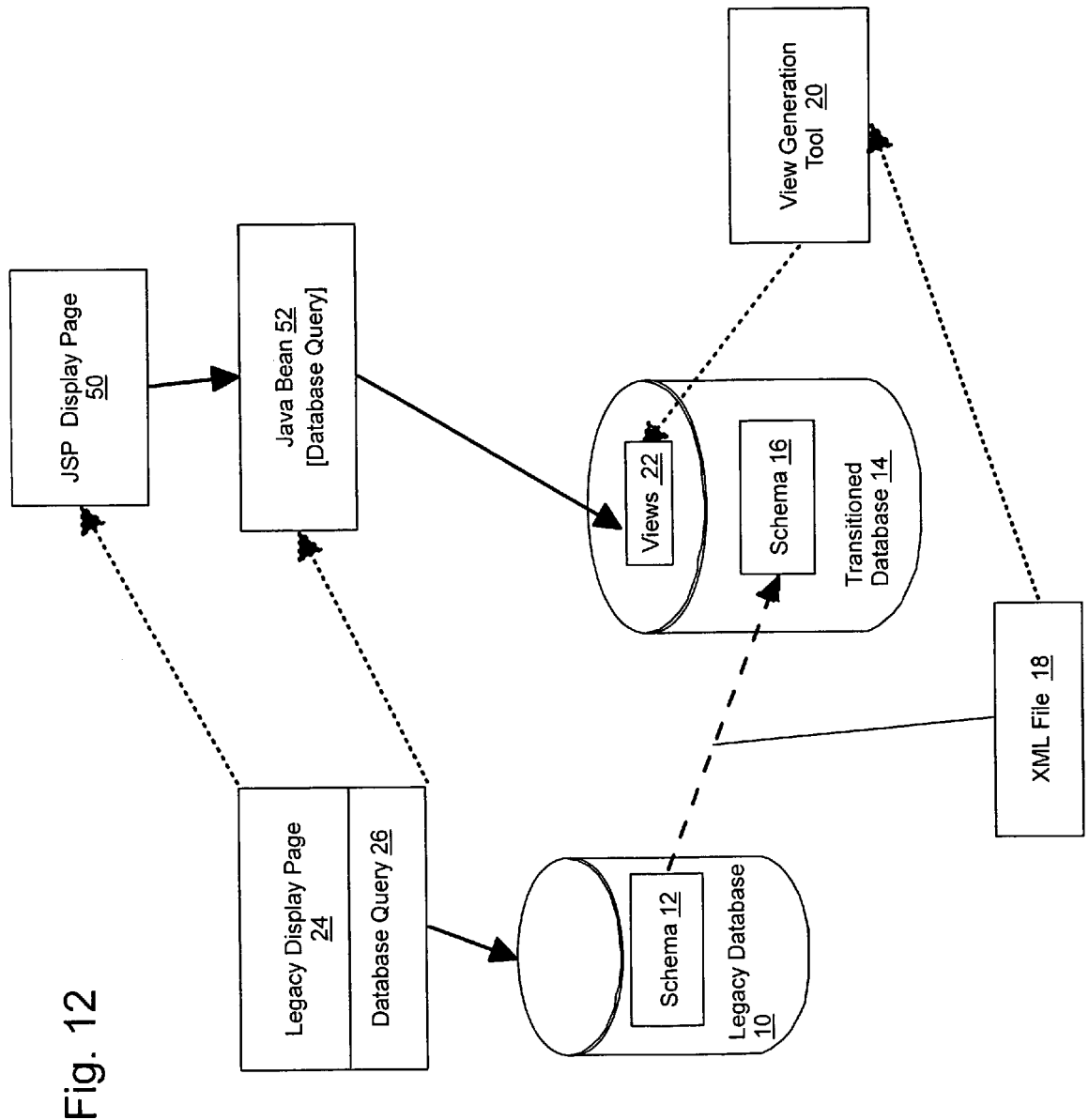
FIG. 12 is a block diagram illustrating components in an implementation of the preferred embodiment relating to the execution of display pages as defined in a legacy application in a J2EE environment.

The above description of the preferred embodiment made with reference to FIG. 1 illustrates how legacy display page 24, which includes database query 26, may be accessed from new J2EE application platform 30. The block diagram of FIG. 12 illustrates how, alternatively, the preferred embodiment may be implemented when legacy display page 24 is itself subject to a transition to a new display page defined in JSP. In FIG. 12, legacy display page 24 is again shown having database query 26. In FIG. 12, database query 26 is shown in execution against legacy database 10 (having schema 12). In FIG. 12, as in FIG. 1, transitioned database 14 has schema 16. Also as shown in FIG. 1, XML file 18 and view generation tool 20 are used to define views 22.

In the example of FIG. 12, however, the application to which a transition has been made includes JSP display page 50. The transition to a new J2EE environment permits legacy display page 24 to be redefined in JSP. However, as indicated above, the preferred embodiment permits relational database query 26 to be retained without the need for rewriting the query for the new schema, as long as a new set of views (views 22) is defined to effectively map the new database schema to the legacy database schema. In the example of FIG. 12, database query 26 is encapsulated in Java bean 52. Thus JSP display page definition 50 will be able to use database query 26, without the need to rewrite database query 26, through access to Java bean 52, which is defined to encapsulate legacy query 26.

As is apparent from a comparison of the components shown in FIG. 1 and in FIG. 12, the preferred embodiment permits continued usage of a legacy display page definition even after transition away from the legacy system (as is shown in FIG. 1). At a time convenient to the user, a new JSP page definition may be created to replicate (or replace) the legacy display page in JSP for the J2EE environment (the resulting arrangement is shown in the example of FIG. 12). In this way, an orderly and staged transition from the legacy system to the J2EE-based system, with JSP display pages, may be carried out.

As shown above, the preferred embodiment provides a system and method to assist in carrying out transitions from legacy applications to new applications, and in particular to applications implemented in the J2EE environment.

Various embodiments of the present invention having been thus described in detail by way of example, it will be apparent to those skilled in the art that variations and modifications may be made without departing from the invention. The invention includes all such variations and modifications as fall within the scope of the appended claims.

What is claimed is:

1. A method for the transition of a legacy application to a new application, the legacy application being defined to access a legacy relational database having a legacy schema and the new application being defined to access a transitioned relational database having a new schema, said method comprising the steps of:
   a. selecting a set of transition schema changes corresponding to the transition of the legacy schema to the new schema, and
   b. generating one or more relational database views for the transitioned relational database using a pre-defined set of relational database views relating to schema changes and selecting views in the pre-defined set that correspond to the set of transition schema changes;
   wherein the one or more relational database views map the new schema to the legacy schema, and database queries originally defined for the legacy database are executed against the transitioned relational database;
   wherein the pre-defined set of relational database views includes views relating to schema changes selected from the set of column-wise splits, row-wise splits, column-wise merges, row-wise merges, column name changes, column type changes, nullable to not-nullable transitions, value maps, column splits, and column merges;
   wherein said step of determining a set of transition schema changes further comprises defining an XML file representing the transition schema changes; and
   wherein said step of generating one or more relational database views for the transitioned relational database further comprises accepting the XML file as input and generating the one or more relational database views based on the content of the XML file.

2. The method of claim 1, wherein said step of determining a set of transition schema changes further comprises defining a representation of the transition schema changes.

3. The method of claim 2, wherein said step of generating one or more relational database views for the transitioned relational database further comprises accepting the representation of the transition schema changes as input and generating the one or more relational database views based on the representation.

* * * * *